(12) United States Patent
Harihara

(10) Patent No.: US 7,330,158 B2
(45) Date of Patent: Feb. 12, 2008

(54) MODULE SUBSTRATE WITH ANTENNA AND RADIO MODULE USING THE SAME

(75) Inventor: Yasumasa Harihara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/597,207

(22) PCT Filed: Dec. 28, 2004

(86) PCT No.: PCT/JP2004/019586

§ 371 (c)(1),
(2), (4) Date: Jul. 14, 2006

(87) PCT Pub. No.: WO2005/069441

PCT Pub. Date: Jul. 28, 2005

(65) Prior Publication Data

US 2007/0040120 A1    Feb. 22, 2007

(30) Foreign Application Priority Data

Jan. 16, 2004    (JP) ............................. 2004-009792

(51) Int. Cl.
  *H01Q 9/28*    (2006.01)
  *H01Q 1/38*    (2006.01)
(52) U.S. Cl. ................. 343/795; 343/700 MS
(58) Field of Classification Search ......... 343/700 MS, 343/795, 830, 846
See application file for complete search history.

(56) References Cited

U.S. PATENT DOCUMENTS 4,051,478 A * 9/1977 Kaloi ................. 343/700 MS
5,218,374 A * 6/1993 Koert et al. ................. 343/789
6,375,780 B1 * 4/2002 Tuttle et al. ................. 156/226

FOREIGN PATENT DOCUMENTS

| JP | LO 9-83239 | 3/1997 |
| JP | LO 11-251509 | 9/1999 |
| JP | LO 2001-251117 | 9/2001 |
| JP | LO 2002-11348 | 4/2002 |
| JP | LO 2002-135037 | 5/2002 |
| JP | LO 2002-259934 | 9/2002 |
| JP | LO 2002-290131 | 10/2002 |
| JP | LO 2003-298464 | 10/2003 |
| JP | LO 2003-309418 | 10/2003 |

* cited by examiner

*Primary Examiner*—Shih-Chao Chen
(74) *Attorney, Agent, or Firm*—Wolff Law Offices, PLLC; Kevin Alan Wolff

(57) ABSTRACT

An object of the present invention is to further miniaturize a module substrate with an antenna while maintaining desirable characteristics. A module substrate with an antenna according to the invention has a substrate body and first and second radiation conductors and provided on one surface of the substrate body and being symmetrical. The first and the second radiation conductors asymmetrical with respect to a first line B that passes a power-supplying the first radiation conductor and a power-supplying point of the second radiation conductor. Therefore, the wavelength of radio waves radiated from the current flowing in one direction as viewed from the first line B is different from that of radio waves radiated from the current flowing in the other direction as viewed from the first line B. As a result, the substrate body can be miniaturized while securing a broader band than the conventional module substrates.

17 Claims, 13 Drawing Sheets

MODULE SUBSTRATE WITH ANTENNA AND RADIO MODULE USING THE SAME

TECHNICAL FIELD

The present invention relates to a module substrate with an antenna and a radio module using the same. More particularly, the invention relates to a module substrate with an antenna, which is suitable to be used in radio IC tags, and to a radio module that uses this module substrate.

BACKGROUND OF THE INVENTION

In recent years, various mobile communication apparatuses utilizing radio waves have been developed. While most of the mobile communication apparatuses have been put to practical use, RFID (Radio Frequency Identification) systems using radio IC tags attract much attention among these apparatuses. The radio IC tag used in the RFID system includes a module substrate with an antenna having a radiation conductor, and a semiconductor IC mounted on the module substrate (see Japanese Patent Application Laid-open No. 2003-298464). By incorporating this radio IC tag into a product tag, a prepaid card, or the like, conveniences of physical distribution management and customer management, as well as billing and settlement are expected to be greatly improved.

Since the radio IC tag is desirably made as small as possible in view of its specific use, the module substrate with an antenna needs to be miniaturized. However, if the module substrate with an antenna is miniaturized, the area of the radiation conductors (antenna conductors) provided on the module substrate with an antenna is reduced. As a result, the antenna band is narrowed and gain is reduced.

In view of this, various methods of miniaturizing the radiation conductors while maintaining desirable characteristics, have been proposed. For example, Japanese Patent Application Laid-open No. 2002-135037 discloses a method of miniaturizing the radiation conductor in which two sides of each radiation conductor constituting a so-called bowtie antenna are inwardly concaved in an arc shape or a stepped shape.

However, accompanying an increasing demand for further miniaturization of the radio IC tags, it is difficult to sufficiently miniaturize the module substrate with an antenna by the method disclosed in Japanese Patent Application Laid-open No. 2002-135037. Miniaturization of the module substrates with an antenna is of course important even if their application field is other than the radio IC tags.

SUMMARY OF THE INVENTION

Accordingly, an object of the present invention is to provide a module substrate with an antenna, which can be miniaturized while maintaining its desirable characteristics, and a radio module that uses the module substrate.

The module substrate with an antenna according to the present invention characterized by including a substrate body; and first and second radiation conductors provided on a predetermined surface of the substrate body and being symmetrical in shape, wherein the first and the second radiation conductors are asymmetrical with respect to a first line that passes a power-supplying point of the first radiation conductor and a power-supplying point of the second radiation conductor.

In the module substrate with an antenna according to the present invention, since the first and the second radiation conductors are asymmetrical with respect to the first line that passes two power-supplying points, the length of radio waves radiated from the current flowing in one direction as viewed from the first line is different from that of radio waves radiated from the current flowing in the other direction as viewed from the first line. As a result, the module substrate can secure a broader band than conventional module substrates, while miniaturizing its substrate body.

In this case, it is preferable that each of the first and the second radiation conductors is designed such that an area of a region on one side as viewed from the first line differs from an area of a region on the other side, and that the length of a first side on the one side as viewed from the first line differs from that of a second side on the other side. The radio waves radiated from the currents flowing in one direction of the first line more greatly differ in wavelength from the radio waves radiated from the currents flowing in another direction as viewed from the first line. Accordingly, a broader band can be secured.

In the present invention, it is preferable that the first sides of the first and the second radiation conductors intersect at lease once, with second lines that connect the power-supplying points and ends of the first sides, at a location different from the power-supplying points. Therefore, the first side of each conductor includes has inwardly hollow concave shape and an outwardly swelled convex shape with respect to the second line. As a result, the first sides can be sufficiently long, while the area is made small. In this case, it is preferable that each of the first sides of the first and the second radiation conductors has an inwardly hollow concave shape near the power-supplying points as viewed from the intersections with the second lines and an outwardly swelled convex shape remote from the power-supplying points as viewed from the intersections. Hence, the first and the second radiation conductors are narrow at parts which are close to the power-supplying points. With such a shape, the conductors can further broaden the band and further increase the gain.

In the present invention, it is preferable that each of the second sides of the first and the second radiation conductors has an outwardly swelled convex shape. Therefore, one surface of the substrate body can be effectively utilized. As a result, the size of the substrate body can be reduced, while maintaining the desired characteristics.

In the present invention, it is preferable that the first and the second radiation conductors extend across the first line, and that a third side connecting one end of the first side and one end of the second side is substantially straight. Therefore, one surface of the substrate body can be effectively utilized. As a result, the size of the substrate body can be reduced, while maintaining the desired characteristics.

In the present invention, it is preferable that the first and the second radiation conductors respectively have a stub region, which extends toward the other radiation conductor, as viewed from the power-supplying point. These stub regions make the power-supplying points appear shifted toward the stub regions. Therefore, the impedance can be adjusted and the central frequency can be lowered.

The module substrate with an antenna according to the present invention preferably further includes a ground pattern provided on a surface different from the predetermined surface of the substrate body and opposed to the first and the second radiation conductors. The ground pattern prevents deterioration of the antenna characteristics even if the module substrate is placed on metal in its practical use. The gain in the zenith direction will increase if the module substrate is placed on a wide metal surface.

The module substrate with an antenna according to the present invention preferably further includes a first land pattern and a second land pattern that are provided on the predetermined surface of the substrate body and located adjacent to the first radiation conductor and the second radiation conductor, respectively. At least a part of the first and the second land patterns is correspondingly provided at the concave shape part of the first side. The land patterns can firmly secure a semiconductor IC on the predetermined surface. Since the land patterns are arranged by utilizing the concave shape part of the first side, the substrate body can be prevented from becoming larger.

In the present invention, the substrate body preferably has a multi-layer structure that incorporates at least a filter element. Accordingly, a radio module that incorporates not only an antenna, but also a bandpass filter or the like can be configured.

The radio module according to the present invention includes the module substrate with an antenna and the semiconductor IC connected to at least the power-supplying points. As described above, the module substrate with an antenna is small and achieves high performance. Hence, the radio module according to the present invention is very suitable to be used in radio IC tags.

As described above, according to the present invention, the module substrate with an antenna can be miniaturized while realizing a broad band and a large gain. Therefore, the module substrate with an antenna and the radio module using the module substrate can be very suitable to be used particularly in radio IC tags.

DETAILED DESCRIPTION OF THE EMBODIMENTS

Preferred embodiments of the present invention will now be explained below with reference to the accompanying drawings.

Figure 1A:
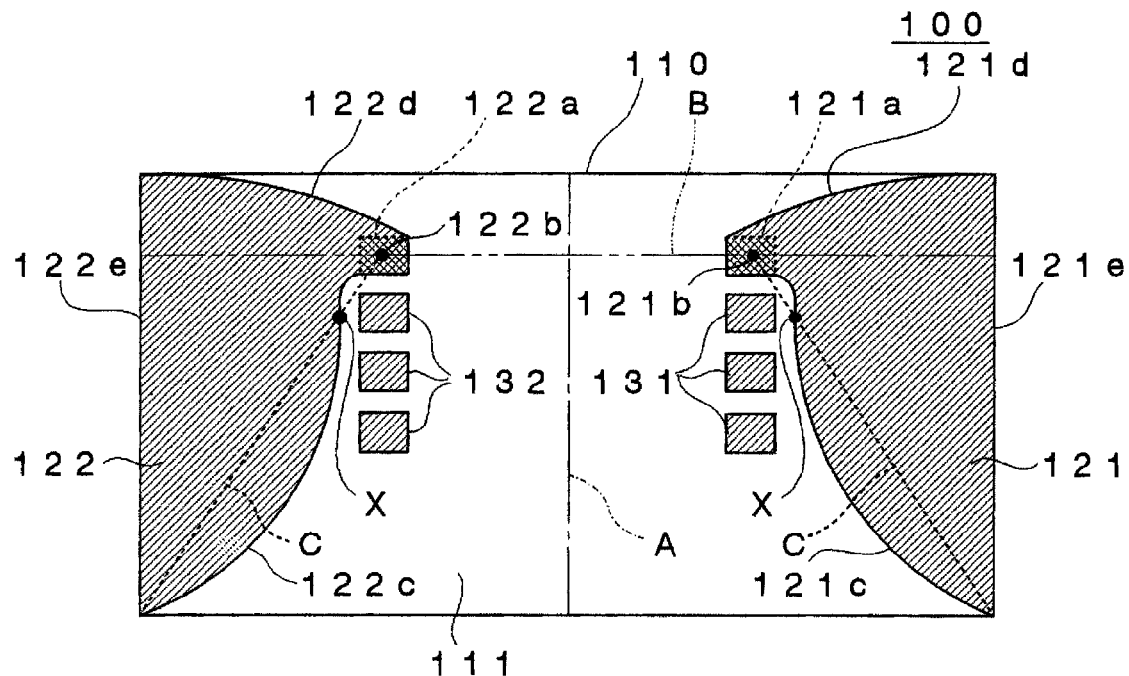
FIGS. 1A and 1B are diagrams showing a configuration of a module substrate 100 with an antenna according to a preferred embodiment of the present invention.
Figure 1B:
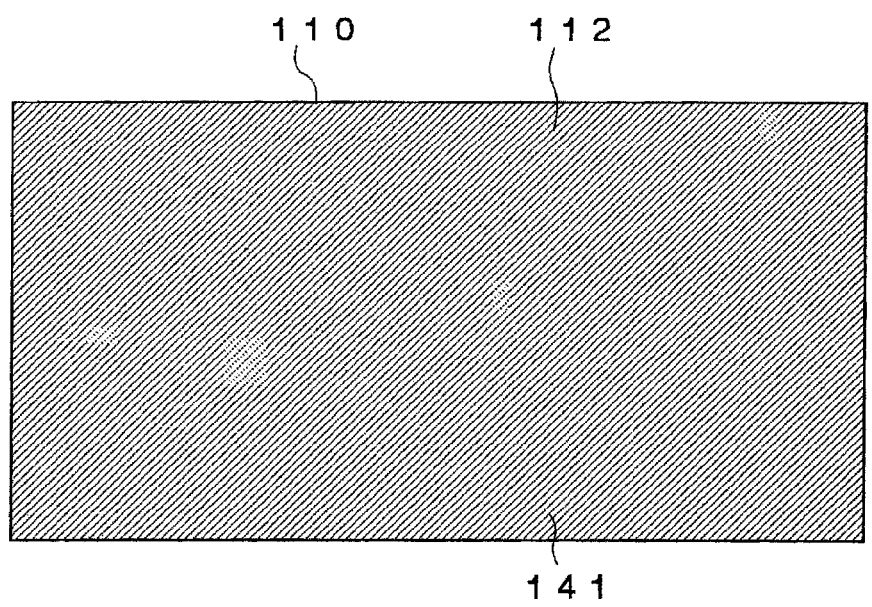

FIGS. 1A and 1B are diagrams showing a configuration of a module substrate 100 with an antenna according to a preferred embodiment of the present invention, FIG. 1A being a top view and FIG. 1B being a bottom view.

As shown in FIGS. 1A and 1B, the module substrate 100 with an antenna according to this embodiment includes a plate-shaped substrate body 110, a first radiation conductor 121 and a second radiation conductor 122, both the radiation conductors being provided on one surface 111 of the substrate body 100, a first land pattern 131 adjacent to the first radiation conductor 121, a second land pattern 132 adjacent to the second radiation conductor 122, and a ground pattern 141 provided on the other surface 112 of the substrate body 110.

The material of the substrate body 110 can be appropriately selected according to the desired antenna characteristics. To miniaturize the substrate body 110, it is preferable that the material has as high permittivity as possible. For example, ceramics and the like can be mentioned as a preferable material having high permittivity.

On the other hand, the material of the radiation conductors and the like, which are formed on the surface of the substrate body 110, is not particularly limited as long as it has high conductivity. Gold (Au), silver (Ag), palladium (Pd), copper (Cu), platinum (Pt), or any alloy thereof can be used.

The first radiation conductor 121 and the second radiation conductor 122 are symmetrical with respect to a center line A of the substrate body 110, and function as the radiation conductors of a so-called dipole antenna. The first radiation conductor 121 and the second radiation conductor 122 have power supply units 121a and 122a, respectively. Electrodes of a semiconductor IC, described later, are connected electrically and mechanically to the power supply units 121a and 122a. The power supply units 121a and 122a have, of course, a predetermined area. In this specification and the scope of claims, a substantial center of both the power supply units is respectively defined as a "power-supplying point". Thus, as shown in FIG. 1A, the substantial center of the power supply unit 121a is a power-supplying point 121b of the first radiation conductor 121, and the substantial center of the power supply unit 122a is a power-supplying point 122b of the second radiation conductor 122.

As shown in FIG. 1A, the first and the second radiation conductors 121 and 122 are asymmetric with respect to a first line B that passes both the power-supplying point 121b of the first radiation conductor 121 and the power-supplying point 122b of the second radiation conductor 122. Of each radiation conductor, one region on one side of the first line B and the other region on the other side of the first line B differ in their area. In an ordinary bowtie antenna, the two radiation conductors that make a pair are shaped in an isosceles triangle, and each radiation conductor is symmetrical with respect to a line passing the power-supplying points in a vertical direction. However, in the present invention, each radiation conductor is asymmetrical in the vertical direction. This planer shape of the radiation conductors greatly contributes to the miniaturization of the radiation conductors.

The planer shape of the first and the second radiation conductors 121 and 122 will be described in detail.

Figure 2:
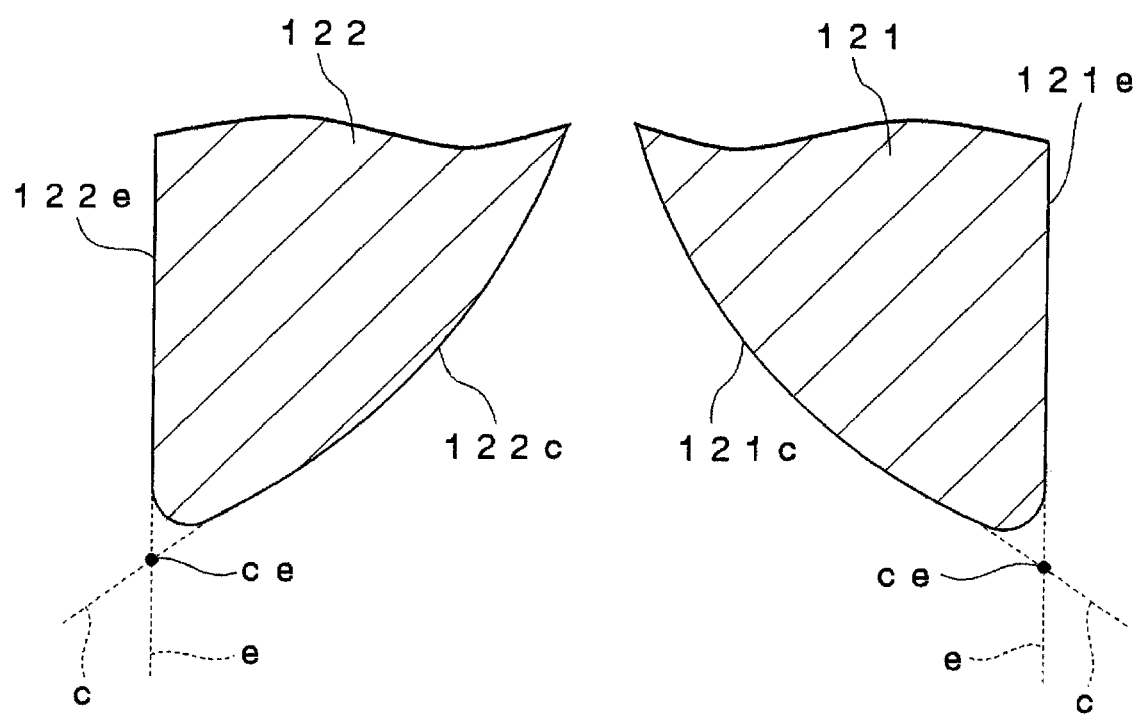
FIG. 2 is an explanatory diagram of a position taken by an edge when corners of first sides 121c and 122c and third sides 121e and 122e are curved.

The first and the second radiation conductors 121 and 122 respectively have, as viewed from the first line B, first sides 121c and 122c on a lower side of FIG. 1A, second sides 121d and 122d on an upper side of FIG. 1A, and third sides 121e and 122e that connect between ends of the first sides 121c and 122c and ends of the second sides 121d and 122d, respectively. In principle, the "ends" of the first sides 121c and 122c are, a corner defined by the first side 121c and the third side 121e and a corner defined by the first side 122c and the third side 122e. In practice, however, it is extremely difficult to form these corners precisely due to the limitation of manufacture precision. In an actual product, therefore, the corners defined by the first sides 121c and 122c and the third sides 121e and 122e are considered as curved as shown in FIG. 2. In this case, intersections ce of lines c as imaginary extensions of the first sides 121c and 122c, and lines e as imaginary extensions of third sides 121e and 122e are regarded as "ends" of the first sides 121c and 122c, for the sake of convenience.

Figure 3:
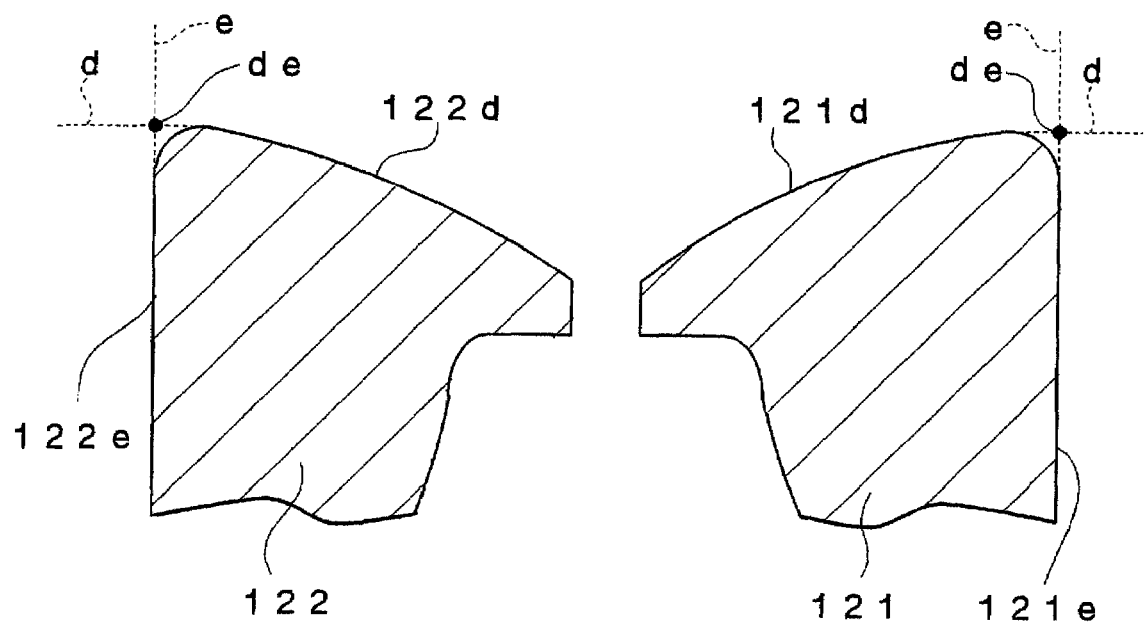
FIG. 3 is an explanatory diagram of a position taken by an edge when corners of second sides 121d and 122d and the third sides 121e and 122e are curved.

This holds true of the "ends" of the second sides 121d and 122d. If the corners are curved as shown in FIG. 3, the intersections de of lines d as imaginary extensions of the second sides 121d and 122d, and lines e as imaginary extensions of the third sides 121e and 122e are regarded as "ends" of the second sides 121d and 122d, for the sake of convenience.

As shown in FIG. 1A, the first sides 121c and 122c of the first and the second radiation conductors 121 and 122 are longer than the second sides 121d and 122d. Hence, the radio waves radiated from the currents flowing along the first sides 121c and 122c differ in wavelength from the radio waves radiated from the currents flowing along the second sides 121d and 122d. As a result, a broad band can be secured.

Assume that there are two second imaginary lines C, one connecting the power-supplying point 121b and one end of the first side 121c, and the other connecting the power-supplying point 122b and one end of the first side 122c. The first sides 121c and 122c then intersect once with these second lines C, respectively, at positions different from the power-supplying points 122b and 122b. In FIG. 1A, the intersections are designated as X. This means that each of the first sides 121c and 122c has two parts, one on an inner side with the second line C as a baseline, that is, concaved toward the center of the corresponding radiation conductor, and the other on an outside of the second line C, that is, convexed outwards or away from the center of the corresponding radiation conductor. Accordingly, the first sides 121c and 122c can be sufficiently long, while the area is made small. In this embodiment, the concaved parts are located near the power-supplying points 121b and 122b as viewed from the intersections with the second lines C, and the convexed parts are located on the other side of the power-supplying points 121b and 122b as viewed from the intersections with the second lines C. The radiation conductors 121 and 122 therefore are narrow at those parts which are close to the power-supplying points 121b and 122b, respectively. This specific shape greatly contributes to the increase in band and gain.

Although it is most preferable, as in this embodiment, that the first sides 121c and 122c intersect with the second lines C only once, at positions different from the power-supplying points 121b and 122b, they may intersect with the second lines C twice or more. However, the more times they intersect with the lines C, the more largely the first sides 121c and 122c will "curve". If the first sides curve too much, the gain tends to decrease. It is therefore preferable that the first sides intersect with the lines C twice or less, at positions different from the power-supplying points 121b and 122b. More preferably, as mentioned above, they should intersect with the lines C only once.

On the other hand, the second sides 121d and 122d of the first and the second radiation conductors 121 and 122 are outwardly convexed as shown in FIG. 1A. With this shape, the surface 111 of the substrate body 110 can be effectively utilized. As a result, the substrate body 110 can be miniaturized, while maintaining the desired characteristics.

As shown in FIG. 1A, the third sides 121e and 122e of the first and the second radiation conductors 121 and 122 substantially vertically intersect with the first line B. That is, they are substantially straight. The surface 111 of the substrate body 110 can therefore be used effectively. As a result, the substrate body 110 can be miniaturized while maintaining the desired characteristics. The expression "substantially straight" includes the case where the corners are curved as has been explained with reference to FIG. 2 and FIG. 3. Even in this case, the third sides 121e and 122e are regarded as "substantially straight" if they lie on the lines each connecting the intersections ce and de.

Described so far are the planer shapes of the first and the second radiation conductors 121 and 122.

On the one surface 111 of the substrate body 110, the first land pattern 131 is provided adjacent to the first radiation conductor 121, and the second land pattern 132 is provided adjacent to the second radiation conductor 122. A part of the first land pattern 131 is provided so as to correspond to the concaved part of the first side 121c of the first radiation conductor 121. A part of the second land pattern 132 is provided so as to correspond to the concaved part of the first side 122c of the second radiation conductor 122. In other words, the first sides 121c and 122c remain not interfered with the first and the second land patterns 131 and 132, respectively, by their concaved parts. The first and the second land patterns 131 and 132 serve to mechanically hold the semiconductor IC, as will be described later.

As shown in FIG. 1B, the ground pattern 141 is provided on almost the entire other surface 112 of the substrate body 110. This suppresses changes in the characteristics when a radio IC tag or the like, which uses the module substrate 100 with an antenna, is placed on a metal. Since the dipole antenna does not require, by its nature, ground patterns of this type. Therefore, ordinary dipole antennas do not have ground patterns of this type. However, if the ground pattern is removed from the module substrate with an antenna, the antenna characteristics such as impedance, will remarkably change when the substrate is placed on a metal. Therefore, removal of the ground pattern will be a major problem when the substrate is used in a radio IC tag or the like, because it is unpredictable where the radio IC tag will be attached to. This is why the module substrate 100 with an antenna according to the present embodiment includes the ground pattern 141 that faces the first and the second radiation conductors 121 and 122, and the ground pattern 141 effectively prevents the antenna characteristics from being degraded at practical use thereof. If placed on a wide metal surface, the module substrate 100 with an antenna according to this embodiment will have a larger gain in the zenith direction. The module substrate 100 with an antenna according to this embodiment is therefore very suitable to be used in radio IC tags.

Described so far is the configuration of the module substrate 100 with an antenna.

Figure 4:
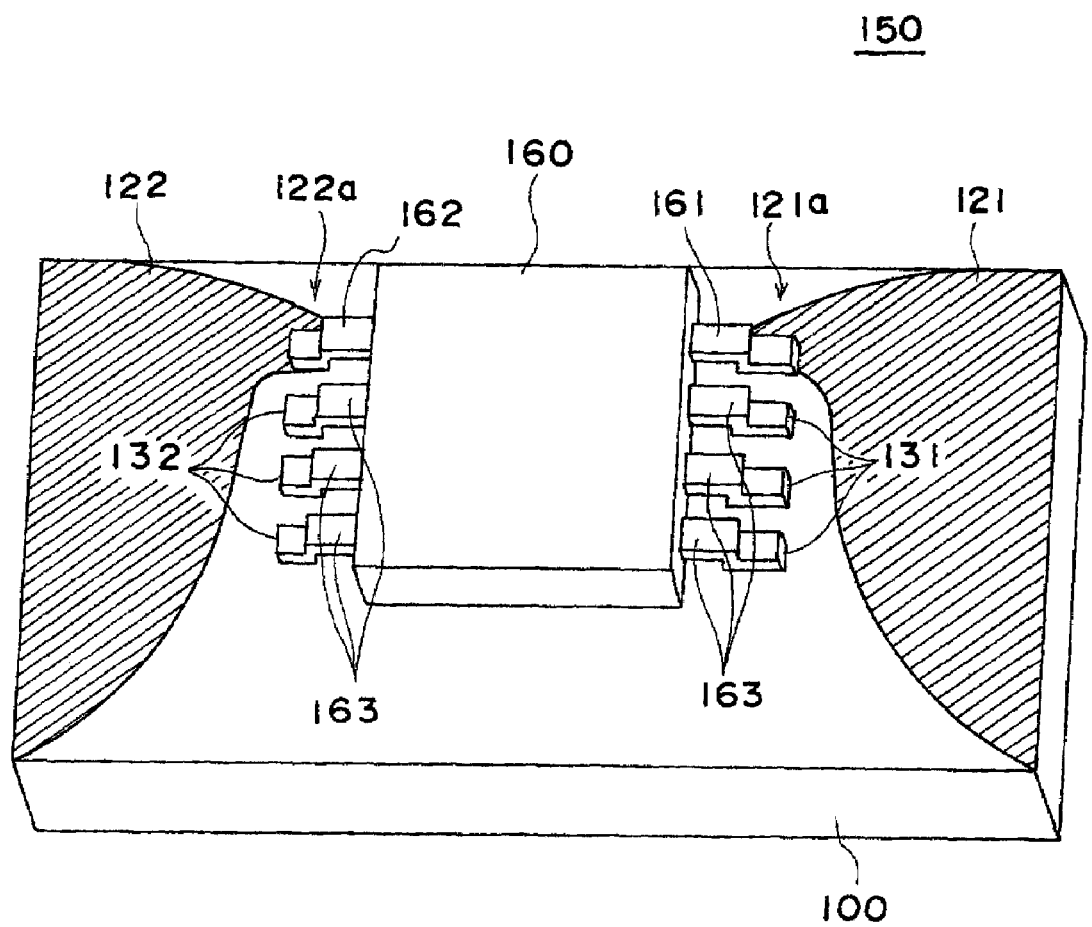
FIG. 4 is a schematic perspective view of the configuration of a radio module 150 using the module substrate 100 with an antenna.

FIG. 4 is a schematic perspective view of the configuration of a radio module 150 using the module substrate 100 with an antenna.

The radio module 150 shown in FIG. 4 is configured by the module substrate 100 with an antenna shown in FIG. 1, and a semiconductor IC 160 mounted on the one surface 111 of the substrate body 110. The semiconductor IC 160 has a baseband unit that processes signals. It processes signals supplied via the first and the second radiation conductors 121 and 122 and outputs the signals to external devices via the first and the second radiation conductors 121 and 122. The semiconductor IC 160 includes first and second signal terminals 161 and 162 which are electrically and mechanically connected to the power supply units 121a and 122a of the first and the second radiation conductors 121 and 122, respectively. Therefore, the semiconductor IC 160 can obtain power necessary for operation, through the first and the second radiation conductors 121 and 122, and can receive and transmit input and output signals. The semiconductor IC 160 further includes dummy terminals 163, which are mechanically connected to the first and the second land patterns 131 and 132. The dummy terminals 163 firmly secure the semiconductor IC 160 to the module substrate 100 with an antenna. The dummy terminals 163 are provided to fix the semiconductor IC 160 to the module substrate 100 with an antenna, and do not contribute to the receipt and transmission of input and output signals or the supply of power.

As described above, the first and the second radiation conductors 121 and 122 provided on the module substrate 100 with an antenna are asymmetrical with respect to the first line B. As a result, the power supply units 121a and 122a are located near the upper side portion in FIG. 1A. Therefore, the terminals at the edges of the semiconductor IC 160 are allocated as the first and the second signal terminals 161 and 162, as shown in FIG. 4, thereby mounting the semiconductor IC 160 at substantially a central part.

In the present embodiment, since the first and the second radiation conductors 121 and 122 provided on the module substrate 100 with an antenna have the shapes described above, the entire size can be reduced as compared to the conventional size, while maintaining a broad band and a large gain. Furthermore, the antenna characteristics scarcely deteriorate even if the module substrate 100 is placed on a metal at practical use thereof, because the module substrate 100 with an antenna according to the embodiment has the ground pattern 141 that faces the first and the second radiation conductors 121 and 122. Conversely, the gain in the zenith direction increases. Accordingly, both of the module substrate 100 with an antenna and the radio module 150 according to this embodiment are very suitable to be used in radio IC tags.

Furthermore, the first and the second radiation conductors 121 and 122 are a type of dipole antennas. As in a general baseband unit, the input and the output are well balanced. Hence, a balanced-to-unbalanced transformer does not need to be interposed between the baseband unit and the first and the second radiation conductors 121 and 122, which reduces the number of components.

Another preferred embodiment of the present invention is explained next.

Figure 5:
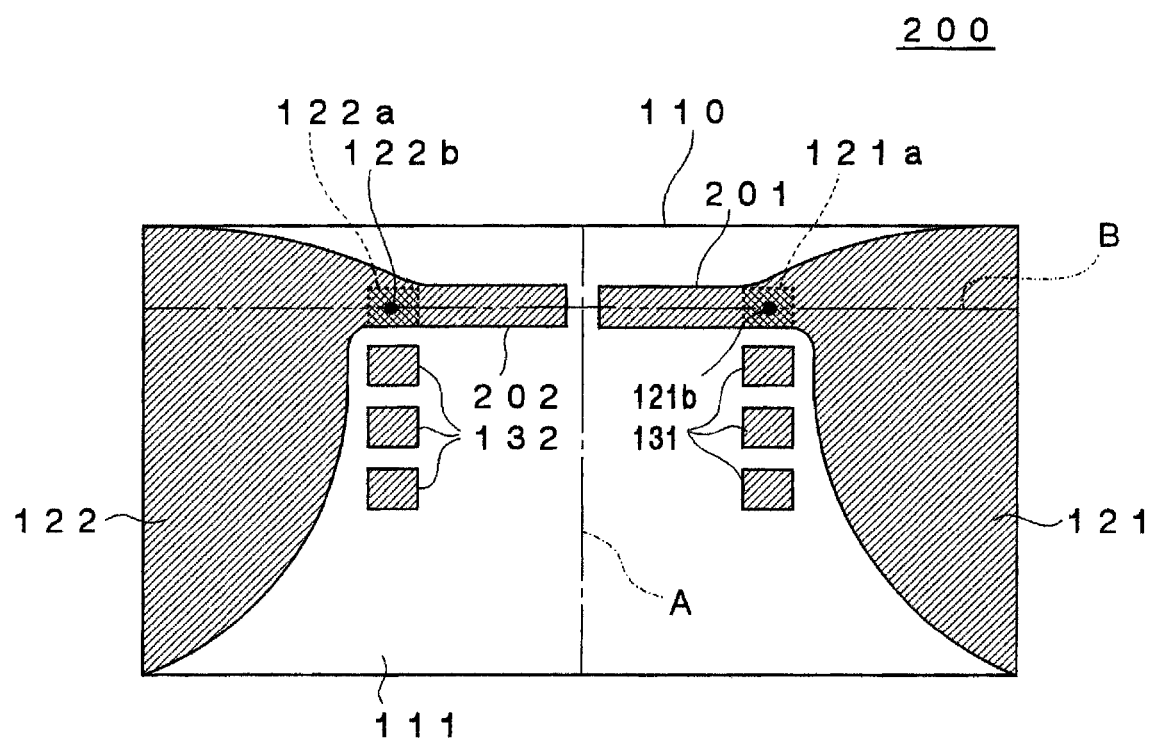
FIG. 5 is a top view showing a configuration of a module substrate 200 with an antenna according to another preferred embodiment of the present invention.

FIG. 5 is a top view showing a configuration of a module substrate 200 with an antenna according to another preferred embodiment of the present invention. Since the module substrate 200 has a bottom surface similar to that of the module substrate 100 with an antenna, redundant diagrams and explanation thereof will be omitted.

As shown in FIG. 5, the module substrate 200 with an antenna according to this embodiment differs from the module substrate 100 with an antenna, in that stub regions 201 and 202 are provided on the first and the second radiation conductors 121 and 122, respectively. The stub regions 201 and 202 extend toward the other radiation conductors, as viewed from the power-supplying points 121b and 122b. In this case, also, the power-supplying points 121b and 122b are provided at the same positions as in the module substrate 100 with an antenna.

In the present embodiment, the power-supplying points appear shifted toward the stub regions 201 and 202, respectively. Therefore, the impedance can be adjusted and the central frequency can be lowered. Further, the provision of the stub regions 201 and 202 does not increase the size of the substrate body 110, because the stub regions 201 and 202 are provided on a region on which the semiconductor IC 160 should be mounted.

Figure 6:
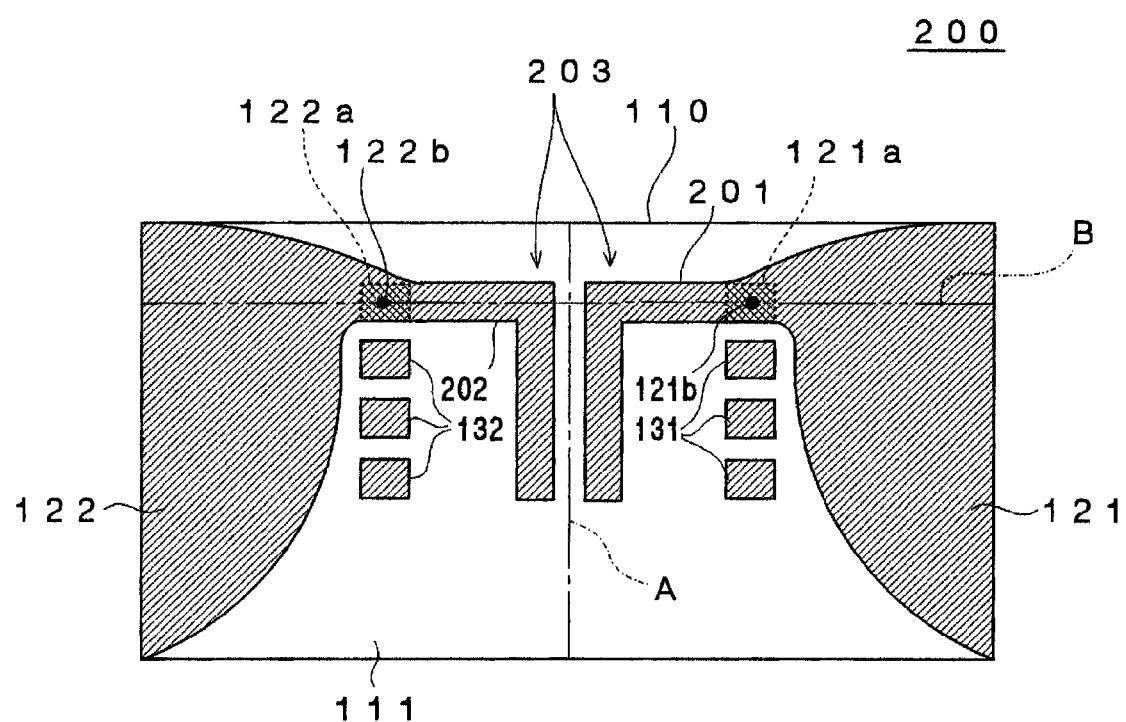
FIG. 6 is a top view of a configuration of a module substrate 200 with an antenna according to a modification.

The stub regions 201 and 202 does not need to have the shape (straight shape) as shown in FIG. 5, as long as each has at least one part that extends toward the other radiation conductor as viewed from the power-supplying points. They may have a bent part 203 as shown in FIG. 6. By providing the bent part 203, the stub regions 201 and 202 can be longer than otherwise. Accordingly, the power-supplying points can appear shifted by a longer distance.

While a preferred embodiment of the present invention has been described hereinbefore, the present invention is not limited to the aforementioned embodiment and various modifications can be made without departing from the spirit of the present invention. It goes without saying that such modifications are included in the scope of the present invention.

Figure 7:
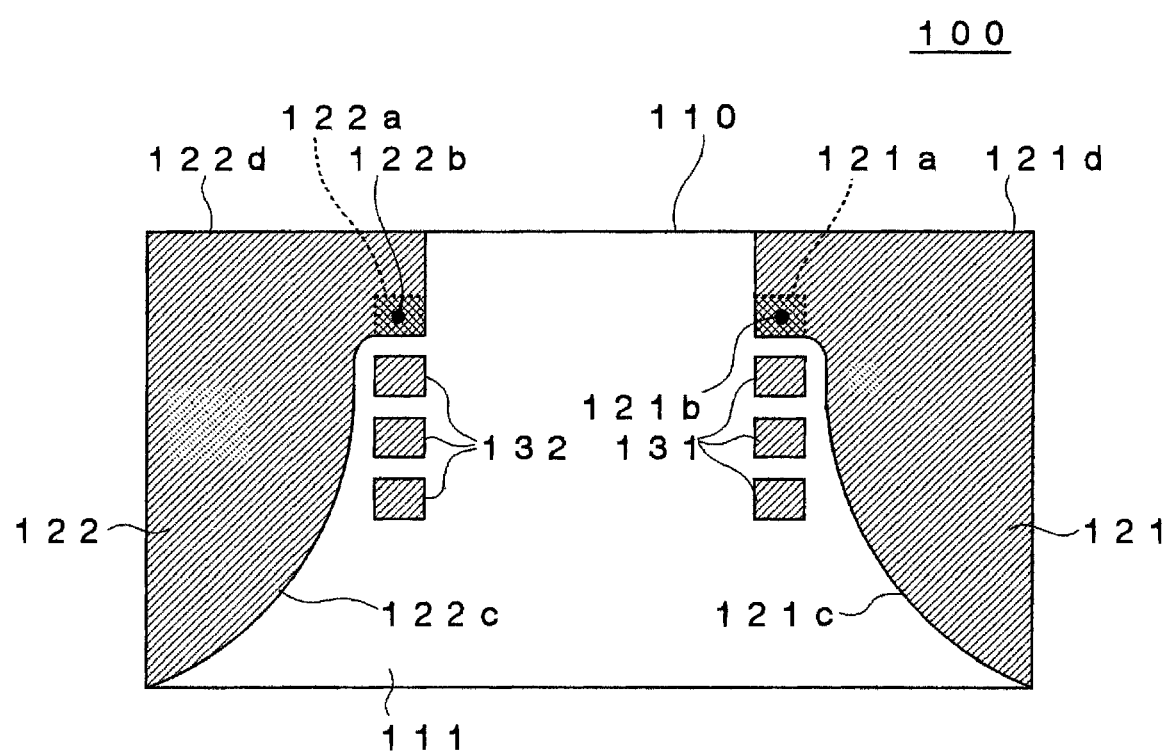
FIG. 7 is a top view of a configuration of a module substrate 100 with an antenna according to a modification.
Figure 8:
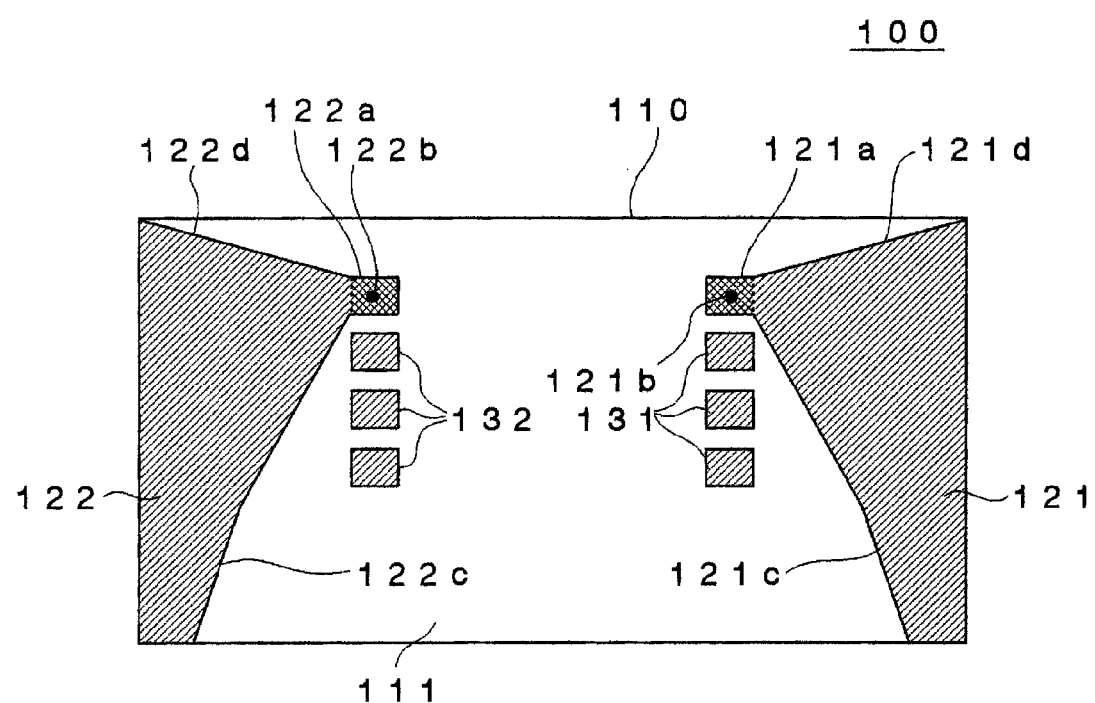
FIG. 8 is a top view of a configuration of a module substrate 100 with an antenna according to another modification.
Figure 9:
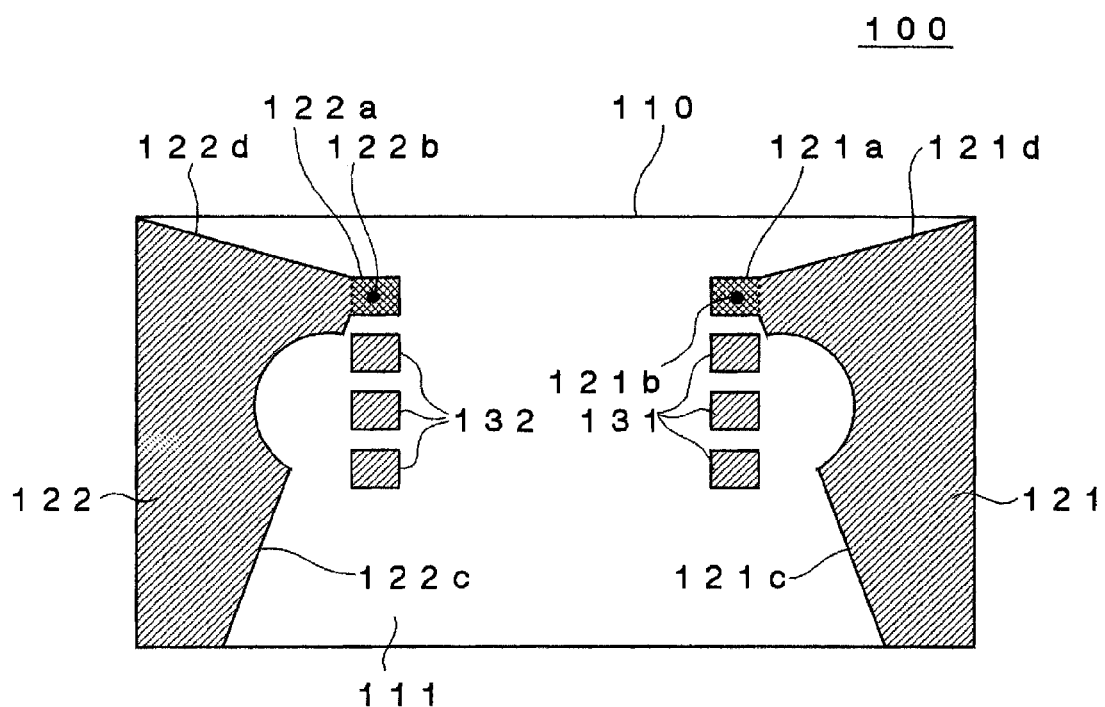
FIG. 9 is a top view of a configuration of a module substrate 100 with an antenna according to further modification.

For example, the shape of the radiation conductor in the embodiment is only a preferable example thereof, and the present invention is not limited thereto. Therefore, as shown in FIG. 7 and FIG. 8, the first sides 121c and 122c or the second sides 121d and 122d, or all these sides may be straight. Alternatively, the first sides 121c and 122c may have a semicircular notch, as shown in FIG. 9.

In the embodiment, the first and the second radiation conductors 121 and 122 are formed, up to the edges of the substrate body 110. However, if the radiation conductors and the like are formed by screen printing or the like, they may be formed with some margin left at the edges of the substrate body 110.

Furthermore, in the embodiment, while the first and the second radiation conductors 121 and 122 are symmetrical with respect to the center line A of the substrate body 110, the symmetry line thereof may not be coincident with the center line A of the substrate body 110. However, if the symmetry line of the first and the second radiation conductors 121 and 122 is made to coincide with the center line A of the substrate body 110 as in the embodiment, the substrate body 110 can have the smallest size possible.

Further, the substrate body 110 does not need to be a single plate. It may have a multi-layer structure composed of a plurality of substrates laid one on another. In this case, the substrate body may incorporate, for example, a filter element. The radio module can include not only an antenna, but also a bandpass filter or the like. If the substrate body 110 has a multi-layer structure, the radiation conductors, the ground pattern, and the like may be provided not on the outer surfaces of the substrate body, but on the surface of individual substrates constituting the multi-layer substrate. If the radiation conductors are provided on inner surfaces of the multi-later substrate, dielectric members will lie in the zenith direction of the radiation conductors. Accordingly, the central frequency of the antenna can be lowered. Further, the substrate body 110 may be a flexible substrate. In this case, the module substrate with an antenna can have flexibility as a whole, if the radiation conductors and the like are made sufficiently thin.

EXAMPLES

While examples of the present invention are explained below, the present invention is not limited to the examples.

First Example

A module substrate with an antenna with a configuration as shown in FIG. 1 was produced. A semiconductor IC having a baseband unit was mounted on the module substrate, thereby constituting a radio module according to a first example. Antenna characteristics of the radio module according to the first example were measured. Barium-titanium ceramic ($\epsilon r=92$) was used as material of a substrate body. The substrate body was 5 mm in its vertical size (along the central line A), 10 mm in its horizontal size (along the first line B), and 2 mm thick (the distance between the one surface 111 to the other surface 112).

Figure 10:
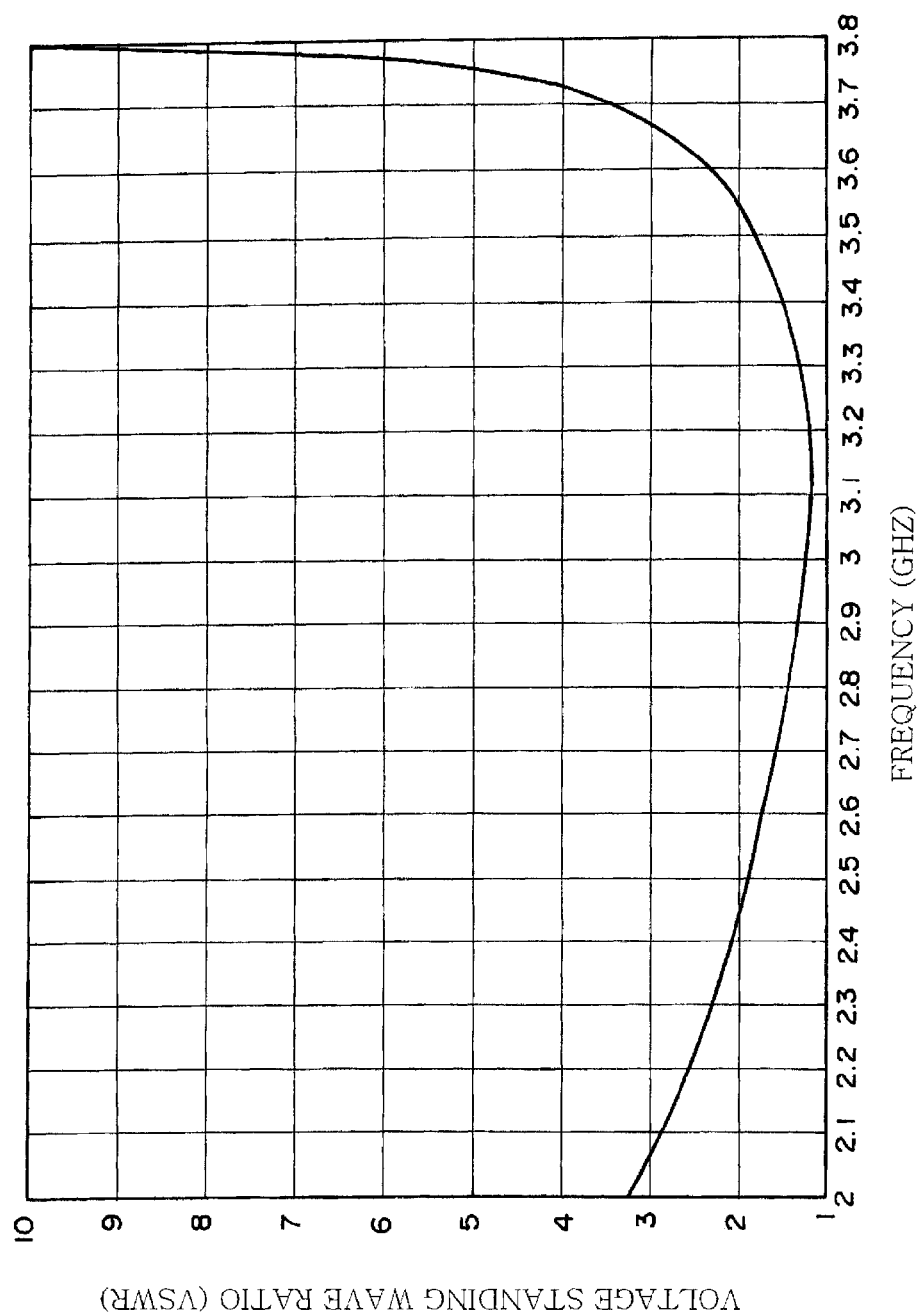
FIG. 10 is a graph of antenna characteristics of a radio module according to a first example.

The measurement results are shown in FIG. 10.

In FIG. 10, the abscissa indicates the frequency, and the ordinate indicates a voltage standing wave ratio (VSWR). The smaller the voltage standing wave ratio, the smaller the loss caused by reflection at a specific frequency. A band for which the ratio is 2 or less can be regarded as the actual band. As shown in FIG. 10, the radio module according to the first example exhibited a band ranging from about 2.43 GHz to about 3.54 GHz, a central frequency of 2.933 GHz, and a bandwidth of about 1.11 GHZ.

Second Example

A module substrate with an antenna with a configuration as shown in FIG. 5 was produced. A semiconductor IC having a baseband unit was mounted on the module substrate, thereby constituting a radio module according to a second example. Stub regions were 1.4 mm long from respective power-supplying points. The size and the material of the substrate body was the same as those in the first example. Antenna characteristics of the radio module according to the second example were then measured.

Figure 11:
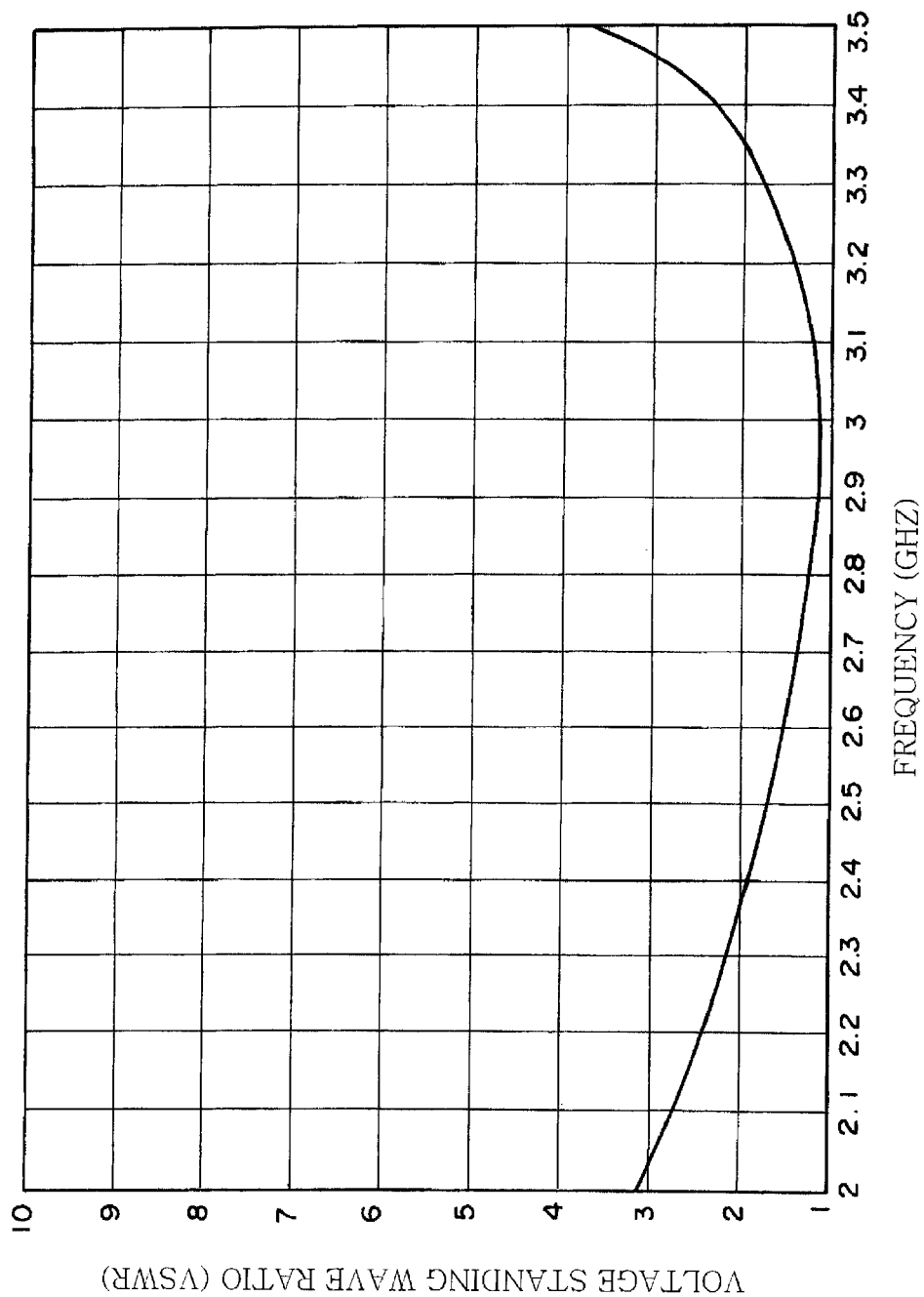
FIG. 11 is a graph of antenna characteristics of a radio module according to a second example.

The measurement results are shown in FIG. 11.

As shown in FIG. 11, the radio module according to the second example exhibited a band ranging from about 2.36 GHz to about 3.35 GHz, a central frequency of 2.812 GHz, and a bandwidth of about 0.99 GHz. Although the bandwidth was slightly narrower than that of the first example, the central frequency shifted to the low-frequency side without changing the size of the substrate body 110.

Comparative Example

Figure 12:
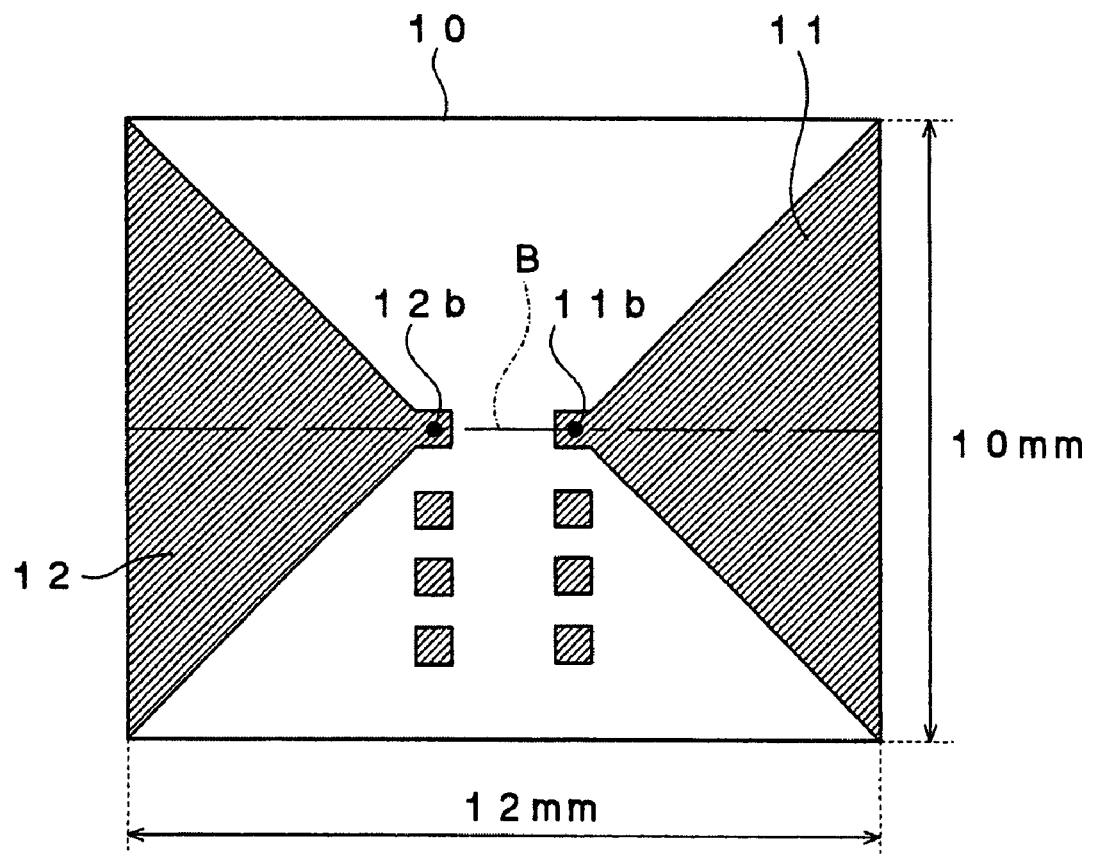
FIG. 12 is a top view of a configuration of a radio module with an antenna according to a comparative example.

As shown in FIG. 12, a substrate body 10 with a width of 10 mm, a length of 12 mm, and a thickness of 2 mm was prepared. A pair of radiation conductors 11 and 12 constituting a bowtie antenna were formed on one surface of the substrate body 10. The radiation conductors 11 and 12 have a planer shape that is substantially an isosceles triangle. Hence, the radiation conductors 11 and 12 are symmetrical with respect to the first line B that passes power-supplying points 11b and 12b. The corresponding two sides of the isosceles triangle of both the radiation conductors are 5.94 mm. A ground pattern was formed almost on the entire other surface of the substrate body 10. A semiconductor IC having a baseband unit was mounted on the module substrate with an antenna, thereby constituting a radio module according to a comparative example. Antenna characteristics of this radio module were measured.

Figure 13:
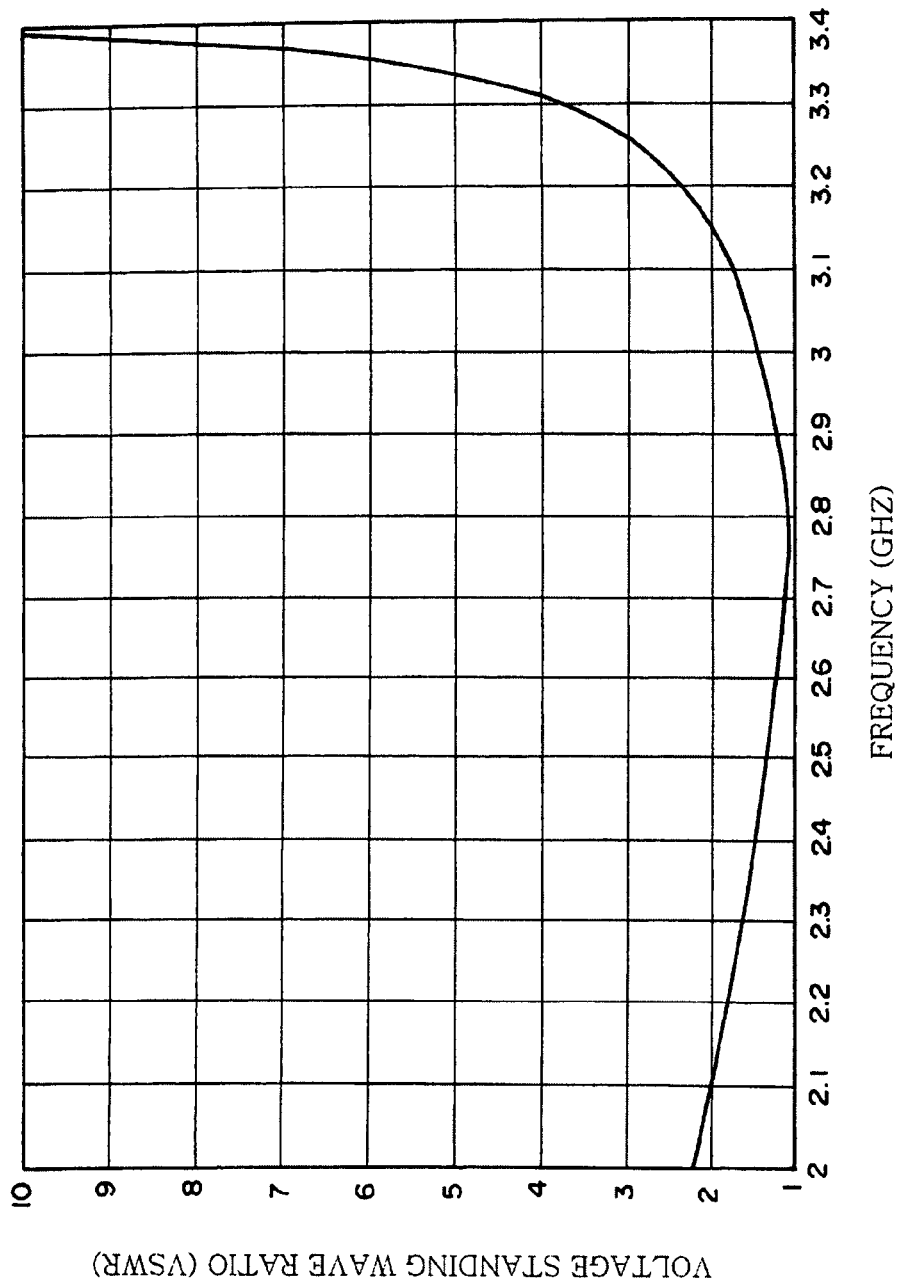
FIG. 13 is a graph of antenna characteristics of the radio module according to the comparative example.

Measurement results are shown in FIG. 13.

As shown in FIG. 13, the radio module according to the comparative example exhibited a band ranging from about 2.10 GHz to about 3.16 GHz, a central frequency of 2.576 GHz, and a bandwidth of about 1.06 GHz. Although this radio module had antenna characteristics similar to those of the radio modules according to the first and the second examples, the substrate body needed to have a planer size twice or more times than that of the first and the second examples.

What is claimed is:

1. A module substrate with an antenna comprising:
   a substrate body; and
   first and second radiation conductors provided on a predetermined surface of the substrate body and being symmetrical in shape, wherein
   the first and the second radiation conductors are asymmetrical with respect to a first line that passes a power-supplying point of the first radiation conductor and a power-supplying point of the second radiation conductor, each of the first and the second radiation conductors is designed such that an area of a region on one side as viewed from the first line differs from an area of a region on the other side, and each of the first and the second radiation conductors has a first side on the one side as viewed from the first line and a second side on the other side, the length of the first side differing from that of the second side.

2. The module substrate with an antenna as claimed in claim 1, wherein each of the first sides of the first and the second radiation conductors intersect at least once, with second lines that connect the power-supplying points and ends of the first sides, at a location different from the power-supplying points.

3. The module substrate with an antenna as claimed in claim 2, wherein each of the first sides of the first and the second radiation conductors has an inwardly hollow concave shape on the side of the power-supply points as viewed from intersecting points of the first sides with the second lines and an outwardly swelled convex shape on the other side of the power-supply points as viewed from the intersecting points.

4. The module substrate with an antenna as claimed in claim 3, further comprising a first land pattern and a second land pattern provided on the predetermined surface of the substrate body and located adjacent to the first radiation conductor and the second radiation conductor, respectively, wherein at least a part of the first and the second land patterns is correspondingly provided at the concave shape part of the first side.

5. The module substrate with an antenna as claimed in claim 1, wherein each of the second sides of the first and the second radiation conductors has an outwardly swelled convex shape.

6. The module substrate with an antenna as claimed in claim 1, wherein each of the first and the second radiation conductors further comprises a third side extending across the first line, wherein each of the third sides has substantially linear shape.

7. The module substrate with an antenna as claimed in claim 1, wherein the first and the second radiation conductors respectively have a stub region, which extends toward the other radiation conductor, as viewed from the power-supply point.

8. The module substrate with an antenna as claimed in claim 1, further comprising a ground pattern provided on a surface different from the predetermined surface of the substrate body and opposed to the first and second radiation conductors.

9. A module substrate with an antenna comprising:
a substrate body; and
first and second radiation conductors provided on a predetermined surface of the substrate body and being symmetrical in shape, wherein
the first and the second radiation conductors are asymmetrical with respect to a first line that passes a power-supplying point of the first radiation conductor and a power-supplying point of the second radiation conductor and the first and the second radiation conductors respectively have a stub region, which extends toward the other radiation conductor, as viewed from the power-supplying point.

10. The module substrate with an antenna as claimed in claim 9, wherein each of the first and the second radiation conductors is designed such that an area of a region on one side as viewed from the first line differs from an area of a region on the other side.

11. The module substrate with an antenna as claimed in claim 10, wherein each of the first and the second radiation conductors has a first side on the one side as viewed from the first line and a second side on the other side.

12. The module substrate with an antenna as claimed in claim 11, wherein each of the first sides of the first and second radiation conductors intersect at least once, the second lines that connect the power-supplying points and ends of the first sides, at a location different from the power-supplying points.

13. The module substrate with an antenna as claimed in claim 12, wherein each of the first sides of the first and the second radiation conductors has an inwardly hollow concave shape on the side of the power-supply points as viewed from intersecting points of the first sides with the second lines and an outwardly swelled convex shape on the other side of the power-supply points as viewed from the intersecting points.

14. The module substrate with an antenna as claimed in claim 13, further comprising a first land pattern and a second land pattern provided on the predetermined surface of the substrate body and located adjacent to the first radiation conductor and the second radiation conductor, respectively, wherein at least a part of the first and the second land patterns is correspondingly provided at the concave shape part of the first side.

15. The module substrate with an antenna as claimed in claim 11, wherein each of the second sides of the first and the second radiation conductors has an outwardly swelled convex shape.

16. The module substrate with an antenna as claimed in claim 11, wherein each of the first and the second radiation conductors further comprises a third side extending across the first line, wherein each of the third sides has substantially linear shape.

17. The module substrate with an antenna as claimed in claim 9, further comprising a ground pattern provided on a surface different from the predetermined surface of the substrate body and opposed to the first and the second radiation conductors.

* * * * *